(12) United States Patent
Kogler et al.

(10) Patent No.: US 8,272,931 B2
(45) Date of Patent: Sep. 25, 2012

(54) AIR CONDUCTING DEVICE FOR A VEHICLE INTERIOR

(75) Inventors: Mike Kogler, Karlsruhe (DE); Steve Kober, Treuen (DE); Marco Braun, Lug (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 882 days.

(21) Appl. No.: 12/280,196

(22) PCT Filed: Mar. 23, 2007

(86) PCT No.: PCT/EP2007/002712
§ 371 (c)(1),
(2), (4) Date: Dec. 15, 2008

(87) PCT Pub. No.: WO2007/112889
PCT Pub. Date: Oct. 11, 2007

(65) Prior Publication Data
US 2009/0305624 A1    Dec. 10, 2009

(30) Foreign Application Priority Data
Mar. 31, 2006 (DE) .................. 10 2006 016 278

(51) Int. Cl.
*B60S 1/00* (2006.01)
(52) U.S. Cl. ..................................................... 454/121
(58) Field of Classification Search .............. 454/121, 454/127, 152, 153, 154, 155, 284, 305
See application file for complete search history.

(56) References Cited

U.S. PATENT DOCUMENTS

| | | | |
|---|---|---|---|
| 7,311,936 B2 * | 12/2007 | Niimi | 427/71 |
| 7,517,279 B2 * | 4/2009 | Kober et al. | 454/155 |
| 2005/0239389 A1 * | 10/2005 | Jahn et al. | 454/127 |
| 2006/0217054 A1 * | 9/2006 | Hoehn et al. | 454/127 |

FOREIGN PATENT DOCUMENTS

| | | |
|---|---|---|
| DE | 24 44 116 | 3/1976 |
| DE | 3 202 355 | 9/1982 |
| DE | 19 648 736 | 1/1998 |
| DE | 19 851 490 | 5/2000 |
| DE | 10302862 A1 * | 12/2003 |
| FR | 25 85 637 | 2/1987 |

OTHER PUBLICATIONS

Abstract of DE 10302862A1.*

* cited by examiner

*Primary Examiner* — Steven B McAllister
*Assistant Examiner* — Brittany E Towns
(74) *Attorney, Agent, or Firm* — Fay Kaplun & Marcin, LLP.

(57) ABSTRACT

An air conducting device includes a rigid support, an outlet, a flexible element that is fixedly connected to the outlet and a deflecting means which allows the outlet to be tilted about at least one axis of rotation at least into a first and a second position. The flexible element is fixedly connected to the support at a distance from the outlet such that at least one of the axes of rotation is defined as a substantially stationary axis of rotation in the area of the outlet, at the level of the connection to the flexible element. The air conducting device includes a small size of the components and a small number of required individual parts.

13 Claims, 1 Drawing Sheet

AIR CONDUCTING DEVICE FOR A VEHICLE INTERIOR

FIELD OF INVENTION

The invention relates to an air conducting device, in particular to an air conducting device for a vehicle interior.

BACKGROUND INFORMATION

Known air conducting devices have outflows, through which air can flow for example into the interior of a vehicle. In particular, outflows which enable a change of direction of the airflow are known. For example moveable lamellae are used for this purpose. One alternative is cassettes or plates which are moveable relative to each other and by means of which different air channels can be formed by means of displacement.

The publication DE 32 02 355 A1 discloses for example an air conducting device in which, between a rigid front plate, which can be in particular a visible-side part of an instrument panel, and a moveable rear plate, a large number of tubes which function as outflows is retained, the tubes being able to be connected to each other by elastic webs for stabilisation. The front plate and rear plate have shell-like openings into which the tubes with spherical ends engage. The tubes are retained mechanically by this engagement and by the elastic webs. By moving the rear plate, the tubes can be tilted and an airflow which is conducted through the tubes can be correspondingly conducted.

The disadvantage of this and other known solutions is that air conducting devices of this type require, on the one hand, a lot of constructional space and, on the other hand, a high number of individual parts.

SUMMARY OF INVENTION

The present invention relates to an air conducting device has a small constructional space and a small number of individual parts.

The invention produces an air conducting device, in particular for ventilation of an interior and/or of a windscreen, having a rigid carrier, an outflow, a flexible element which is connected securely to the outflow, and a deflection means, by means of which the outflow can be tilted at least into a first and second position about at least one axis of rotation. According to the invention, the flexible element is connected securely to the carrier at a spacing from the outflow, as a result of which, in the region of the outflow, the at least one axis of rotation is provided as an essentially stationary axis of rotation at the level of the connection to the flexible element.

The flexible element hence enables tilting of the outflow, on the one hand, as a result of which the direction of an airflow which is conducted through the outflow can be changed and ensures, on the other hand, fixing of the outflow in the air conducting device.

The flexible element hence fulfils a double function. As a result of this, complicated components which enable tilting of the outflow or components which ensure fixing of the outflow in the air conducting device can be dispensed with. According to the invention, it is hence possible to produce an air conducting device which is distinguished by a small constructional space and also by a small number of individual parts.

The connection of the outflow to the flexible element can be configured in particular as a circumferential connection, for example the flexible element encloses the outflow over the entire circumference or encloses it circumferentially. This has the advantage that no gaps are produced through which air which is intended to be conducted through the outflows could escape inadvertently.

Alternatively, it is also possible for example that the flexible element is configured in the connection region as a web/webs.

The flexible element is connected securely to the carrier at a spacing from the outflow in order to enable a tilting movement of the outflow. The secure connection of the flexible element to the carrier ensures a sufficiently stationary position of the outflow and an almost stationary axis of rotation in the region of the outflow at the level of the connection, about which the outflow can be tilted.

The flexible element is preferably connected to the carrier in the immediate vicinity of the outflow in order to ensure the stationary nature of outflow and axis of rotation.

The flexible element can be connected to the rigid carrier directly or else however indirectly via one or more intermediate layers, for example a foamed layer.

The outflow is preferably configured in the form a hose or a slot. Other forms are of course also possible.

An advantageous development of the invention provides that the outflow is rigid with respect to the flexible element.

This ensures that the outflow essentially maintains its shape during tilting. The airflow can consequently in fact be changed in the direction thereof but most extensively maintains its shape.

A further advantageous development of the invention provides that the flexible element and the outflow are configured in one piece.

Flexible element and outflow can be produced economically as a one-piece element in particular a single method step, for example as a cast skin or even as an in particular deep-drawn foil.

In order to make it possible that the outflow is rigid with respect to the flexible element, in particular different wall thicknesses or for example also ribbed structures can be provided for outflow and flexible element.

A further advantageous development of the invention provides that the flexible element has a planar configuration.

A further advantageous development of the invention provides that the flexible element forms the visible-side surface of the air conducting device.

The flexible element hence assumes a third function. An additional element which forms the visible-side surface of the air conducting device can consequently be dispensed with. Components and spatial requirements of the air conducting device can consequently be further reduced.

There are possible in this respect as flexible elements, in particular the skins used in the automobile industry for decorative surfaces of cladding parts.

A further advantageous development of the invention provides that the carrier has an opening through which the outflow passes.

It is hence possible to dispose an in particular planar carrier directly or with only a small spacing behind the flexible element, without impairing the tilting movement of the outflow.

A further advantageous development of the invention provides that the deflection means is disposed invisibly situated behind the flexible element, preferably situated behind the carrier.

A further advantageous development of the invention provides that the deflection means is a rigid element which can be displaced in a translatory manner at least in one direction, preferably a plate or a slide which engages on the outflow.

A secure connection between the deflection means and outflow is in particular not necessary. Tilting of the outflow, as preferred according to the invention, can be effected solely by exerting pressure in particular on the outer surface of the outflow.

For the arrangement of the deflection means with the possibility of displacing the latter, the carrier is preferably provided with guiding and retaining means, such as for example, rails, grooves, channels etc.

With a possibility of displacing the deflection means in a translatory manner in two directions which are in particular perpendicular to each other, it is possible to tilt the outflow not only about one axis of rotation but also about a further second axis of rotation which is in particular perpendicular to the first axis of rotation. This presents a high degree of freedom in the choice of orientation of the airflow. This embodiment is suitable in particular for outflows which have a hose-shaped or hose-like configuration.

A further advantageous development of the invention provides that the rigid element engages in the region of the end of the outflow which is situated opposite the region of the connection of the outflow to the flexible element.

With this arrangement, the lever effect for displacing the outflow is exploited most extensively, as a result of which the force expenditure for tilting the outflow is minimised.

A further advantageous development of the invention provides that the rigid element has air conducting ribs for fanning out the airflow.

Via air conducting ribs, the airflow which flows through the outflows can be influenced in addition.

Alternatively, air conducting ribs of this type can also be provided in the outflows themselves.

A further advantageous development of the invention provides that the air conducting device has a plurality of outflows which are disposed in the form of a grating.

This is advantageous for example if a larger surface area, for example the front screen of a car, is intended to be provided with a flow by an air conducting device according to the invention.

The air conducting device according to the invention is suitable in particular for use in a vehicle interior. The air conducting device can thus be integrated in the instrument panel with the function of enabling provision of a flow for the windscreen or provision of a flow for the vehicle interior by means of at least two tilting positions. It is likewise possible to configure the air conducting device according to the invention as a Mann outflow, for example integrated in an instrument panel or switch console.

BRIEF DESCRIPTION OF DRAWINGS

The present invention is now described in more detail with reference to an embodiment which is represented by the following Figures. There are thereby shown.

DETAILED DESCRIPTION

Figure 1:
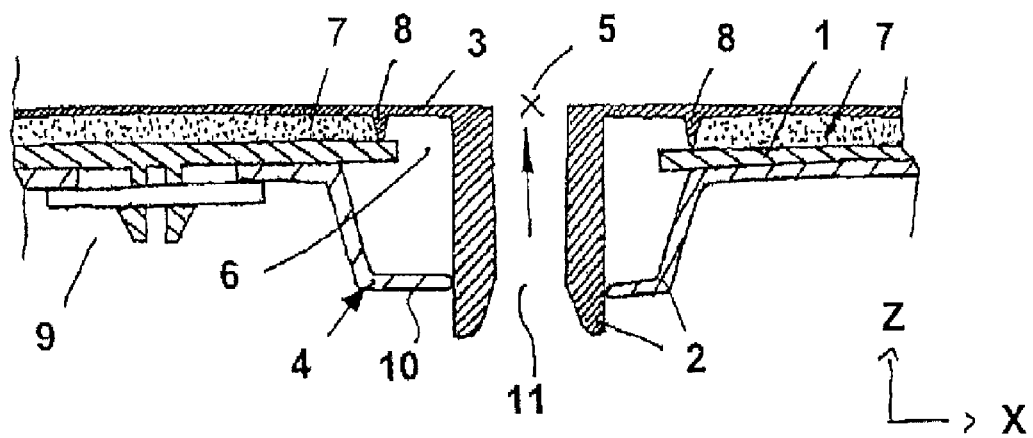
FIG. 1 shows an exemplary embodiment of the air conducting device according to the present invention in the basic position in a cross-sectional view.

FIG. 1 shows a section of an air conducting device according to the invention in the basic position thereof (i.e. the outflow is not tilted) in a cross-sectional view.

The air conducting device represented here concerns an air conducting device which is integrated in an instrument panel and by means of which a windscreen, on the one hand, or else the vehicle interior, can be provided with a flow.

The air conducting device has a rigid carrier 1, a plurality of outflows 2 which are disposed in the form of a grating (only one outflow 2 is visible however in the drawing), a flexible element 3 which is connected securely to the outflow 2 and encloses the outflow 2 without a gap around its entire circumference, and a deflection means 4 by means of which the outflow 2 can be tilted into a first and second position about at least one essentially stationary axis of rotation 5.

The flexible element 3 is connected securely to the carrier 1 via a foamed layer 7 at a spacing from the outflow 2 in the direct vicinity of the outflow 2. As a result, the outflow 2 is retained stationary in position, on the one hand, and defines the stationary axis of rotation 5 in the region of the outflow 2 at the level of the connection to the flexible element 3.

The flexible element 3 and the outflow 2 are configured in one piece as a cast skin comprising an elastic plastic material. The elasticity of the flexible element ensures constant tilting movements of the outflow but is not absolutely necessary for this purpose.

The outflow has a hose-like configuration and is situated in the basic position perpendicularly on the flexible element 3 which has a planar configuration. The one end of the hose-shaped outflow 2 thereby forms a flush termination with the surface of the planar flexible element 3. This ensures a smooth visible-side surface of the planar flexible element 3.

Furthermore, the wall thickness of the outflow 2 is substantially thicker than the layer thickness of the flexible element 3. As a result of this, the outflow 2 is rigid with respect to the flexible element 3, i.e. the outflow 2 can be tilted without said outflow substantially changing the shape thereof.

The flexible element 3 forms the visible-side surface of the air conducting device.

On the rear side of the flexible element 3, firstly a foamed layer 7 and then the carrier 1, which are both configured likewise in a planar manner, is disposed.

Foamed layer 7 and carrier 1 have openings 6 through which the hose-shaped outflows 2 pass. The opening 6 is thereby dimensioned such that tilting of the outflow 2 is possible to an adequate degree.

The flexible element 3 has webs 8, in the region of the opening 6, which abut directly against the carrier 1 and surround the respective opening 6. By means of the webs 8, foam 7 is prevented from reaching the region of the opening 6 during rear-foaming of the flexible element 3 and carrier 1.

The deflection means is configured as a plate-shaped rigid element 4 which is disposed situated behind the carrier.

The plate-shaped element 4 is situated in a planar manner on the rear side of the carrier 1. It is retained by a plurality of guiding and retaining means 9 which are represented only partially in the Figures and are provided on the carrier 1, with the possibility of displacing the plate-shaped element 4 in a translatory manner in the vehicle longitudinal direction, here X-direction.

The plate-shaped element 4 covers the opening 6 through which the outflow 2 passes. In this region, the plate 4 has an opening 11 through which the outflow 2 passes. The diameter of the opening 11 thereby corresponds to the outer diameter of the outflow 2 so that plate 4 and outflow 2 abut against each other almost without a gap.

Furthermore, in the region of the opening 11 of the plate-shaped element 4, the plate-shaped element 4 is provided with a raised portion 10 which is orientated away from the flexible element 3. This raised portion 10 is configured in such a manner that the plate-shaped element 4 engages on the outflow in the region of the end of the outflow which is situated opposite the region of the connection of the outflow 2 to the flexible element 3. As a result, because of the lever effect, the force expenditure for tilting the outflow 2 about the axis of rotation 5 by displacement of the plate-shaped element can be minimised.

By means of translatory displacement of the plate-shaped element 4, here in the X-direction, the outflows 2 can be tilted about their axis of rotation 5. This tilting is continuous.

Figure 2:
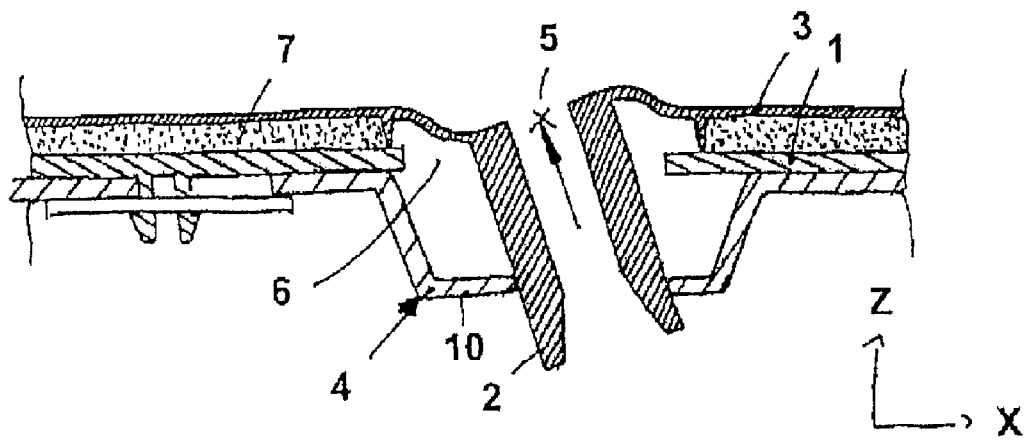
FIG. 2 shows the exemplary embodiment in a first tilting position.

FIG. 2 shows the air conducting device in which the outflow 2 is tilted into a first position. In this position, a windscreen is provided with a flow in this embodiment.

Figure 3:
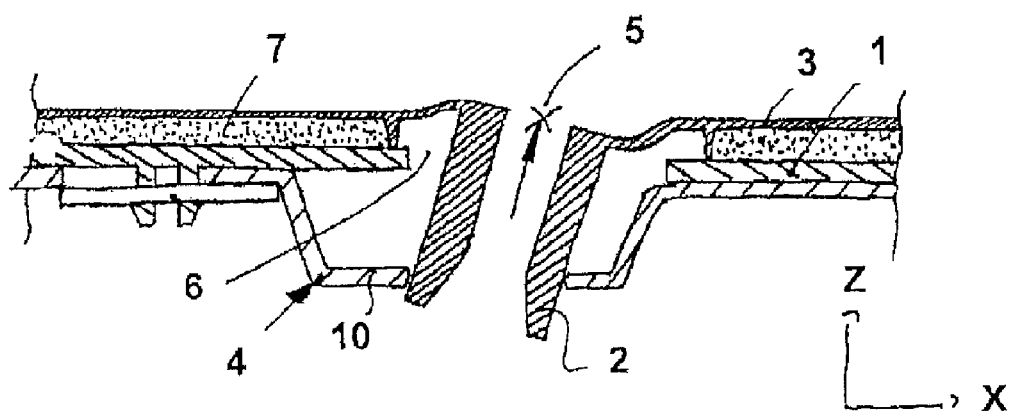
FIG. 3 shows the exemplary embodiment in a second tilting position.

FIG. 3 shows the air conducting device with an outflow 2 tilted into a second position. In this position, the interior of the vehicle is provided with a flow.

In addition, the rigid element can have air conducting ribs in the region of the opening 11 by means of which the airflow can be changed in addition, for example can be fanned out. It is also possible to provide ribs of this type in the outflow 2.

Alternatively, displaceability of the plate-shaped element 4 can also be provided in two dimensions so that tilting of the outflow 2 about two axes of rotation is possible.

The air conducting device according to the invention can be produced in particular completely from polymer plastic materials, if typical supplementary materials for reinforcement, for example glass fibres, are discounted.

The air conducting device according to the invention is distinguished by a small size of the components and by a small number of individual parts and can be produced in particular extremely economically. Furthermore, it is possible with the air conducting device according to the invention to achieve a smooth visible-side surface.

The invention claimed is:

1. An air conducting device, comprising:
    a rigid carrier;
    a movable outflow member for directing air;
    a planar flexible element connected securely to the movable outflow and covering at least a portion of the rigid carrier; and
    a deflection apparatus for titling the outflow member,
    wherein the movable outflow member is tilted, using the deflection arrangement, at least into a first position and a second position about at least one axis of rotation,
    wherein the flexible element is connected securely to the carrier at a spacing from the movable outflow member, as a result of which, in a region of the movable outflow, the at least one axis of rotation is provided as an essentially stationary axis of rotation at the level of the connection to the flexible element.

2. The air conducting device according to claim 1, wherein the air conducting device is utilized for at least one of ventilation of an interior and a windscreen.

3. The air conducting device according to claim 1, wherein the movable outflow is rigid with respect to the flexible element.

4. The air conducting device according to claim 1, wherein the flexible element and movable outflow are configured in one piece.

5. The air conducting device according to claim 1, wherein the flexible element forms a visible-side surface of the air conducting device.

6. The air conducting device according to claim 1, wherein the carrier has an opening through which the movable outflow passes.

7. The air conducting device according to claim 1, wherein the deflection arrangement is disposed invisibly situated behind the flexible element.

8. The air conducting device according to claim 1, wherein the deflection arrangement is disposed invisibly situated behind the carrier.

9. The air conducting device according to claim 1, wherein the deflection arrangement is a rigid element which is displaced in a translatory manner at least in one direction.

10. The air conducting device according to claim 9, wherein the deflection arrangement is, one of a plate and a slide which engages on the movable outflow.

11. The air conducting device according to claim 9, wherein the rigid element engages in a region of an end of the movable outflow which is situated opposite a region of a connection of the movable outflow to the flexible element.

12. The air conducting device according to claim 9, wherein the rigid element has air conducting ribs for fanning out the airflow.

13. The air conducting device according to claim 1, further comprising:
    a plurality of movable outflows disposed in a form of a grating.

* * * * *